(12) United States Patent
Pienimaa et al.

(10) Patent No.: US 6,773,114 B2
(45) Date of Patent: Aug. 10, 2004

(54) PORTABLE MULTIMODE DISPLAY DEVICE

(75) Inventors: Seppo Pienimaa, Salo (FI); Tapani Levola, Tampere (FI); Jyrki Kimmel, Tampere (FI); Jarkko Viinikanoja, Tampere (FI)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 10/010,932

(22) Filed: Dec. 7, 2001

(65) Prior Publication Data

US 2003/0107883 A1 Jun. 12, 2003

(51) Int. Cl.[7] .............................................. G03B 21/14
(52) U.S. Cl. ......................... 353/71; 353/119; 353/122; 345/1.1
(58) Field of Search ......................... 353/71, 119, 122; 40/361–367; 345/1.1, 905

(56) References Cited

U.S. PATENT DOCUMENTS 2,170,967 A * 8/1939 Eppenstein et al. ........... 353/39
5,461,437 A * 10/1995 Tanaka et al. ................ 353/71

* cited by examiner

Primary Examiner—W. B. Perkey
(74) Attorney, Agent, or Firm—Ware, Fressola, Van Der Sluys & Adolphson LLP

(57) ABSTRACT

A portable device having an optical engine adapted to form an image from an image source in four different modes to allow a viewer to view the image. The image source is a microdisplay device, which can be reflective, transmissive or emissive. The display modes include a near-eye display (NED) mode, a near projection display (NPD) mode, a Window mode that provides a virtual image to a viewer at a distance, and a projection display mode that projects an image on a surface at a distance. The portable device has an internal light source to provide illumination to the image source for the first three modes. The portable device is further adapted to receive the light output from an external light source for use with the fourth mode.

20 Claims, 7 Drawing Sheets

PORTABLE MULTIMODE DISPLAY DEVICE

FIELD OF THE INVENTION

The present invention relates generally to a portable device and, more specifically, to a portable device having a high-resolution display for viewing still and video images and having multi-media capability.

BACKGROUND OF THE INVENTION

People that have a portable lifestyle would appreciate instant access to a large amount of information via a portable device, such as a mobile phone, personal data assistant, communicator and the like. While it is a common practice to use a low-resolution liquid-crystal display (LCD) panel to display network information and text messages, it is preferred to use a high-resolution display to browse rich information content of text and images. The high-resolution displays typically have at least SVGA (800×600 pixels) resolution and are of an active matrix type. They can be used for direct view displays or virtual displays. The virtual displays are known as Near Eye Displays (NED). Direct view displays can be visible simultaneously to several observers, whereas the virtual display is only for one person. Virtual displays consist typically of a microdisplay and imaging optics. They can be monocular or binocular. The perceived image in a virtual display can be larger than the device itself. The usability of the virtual display depends very much on the performance of the microdisplay and optics.

The size of the beam of light emerging from imaging optics towards the eye is called exit pupil. In NED, it is typically of the order of 10 mm in diameter. The ease of the use of a virtual display would be improved significantly if the exit pupil were enlarged. When the exit pupil is large enough, the device can be at a distance from the eye, and the display would not then be NED, but would still be a virtual display. In this context, this operating mode is called Window-mode.

The pixel pitch, which is resolvable to the human eye, determines the necessary size of a high-resolution direct view display. This means, in practice, that the size of the display would be larger than the small portable device itself. In addition to virtual display, projection of an image also provides a method to overcome this dilemma. However, the power consumption of the illumination would be too high for a battery operated portable device, even if the projected image is only about 10 inches in diagonal. It is advantageous and desirable to provide a method that can show high-resolution images in reasonable size. In battery-operated devices, the window or projection mode is desirable. The power consumption in window mode is slightly larger than in NED mode, but is reasonable for a battery operation. The power consumption in projection mode depends on the size of the projected image. Thus, in battery operation the projected image size would be limited. If the projected image is the size of a typical computer monitor or larger, a connection to an external light source is necessary.

SUMMARY OF THE INVENTION

The primary objective of the present invention is to use a portable device having a display system, which can work in several display modes, using a microdisplay as an image source and enlarging the image by different optical arrangements corresponding to different display modes.

The first mode of operation is a virtual Near Eye Display (NED), which typically uses a microdisplay as an image source and an imaging optical arrangement to deliver the image to the eye of a viewer.

The second mode is a Near Projection Display (NPD), which uses a near field projection optical arrangement to provide a projected image on a screen at a near distance of 5–25 cm, for example.

The third mode is a Window Mode Display (WMD), where the image appears through a special optical element, which enlarges the exit pupil of the imaging optical arrangement so that the image appearing on the microdisplay is provided as a virtual image to a viewer at a distance.

The fourth mode is Projection Display (PD), whereby the image is projected onto a screen, at a distance of 0.5 m–2.5 m from the device, and the real image appears to be up to 1 m in diagonal, for example.

According to the present invention, an optical engine is used to form an image based on the optical arrangements of each mode of operation of the device. The optical engine consists of an image source, such as a microdisplay device, a light source, one or more lenses for collecting light from the light source for illuminating the image source, other optical elements and one or more lenses which form the imaging optics. A number of different lens arrangements are used to achieve the desired display modes. The internal light source, powered by one or more batteries in the portable device, is used for illumination in the first three modes. For projecting an image at a screen disposed at a distance from the portable device, however, an external light source may be needed. Preferably, the illuminating light from the external light source is brought to the portable device via an optical light guide.

Accordingly, the present invention provides a portable device having a plurality of selectable display modes for providing an image to a viewer, the portable device comprising:

an image source;

an illuminating light source for providing illuminating light to the image source for providing output light from the image source;

a first optical arrangement for forming the image from the output light along an optical path of the first optical arrangement; and a second optical arrangement, disposed in the optical path, for modifying the image forming of the first optical arrangement.

According to the present invention, the selectable display modes include:

a first mode for allowing the viewer to perceive the image by placing an eye in the optical path adjacent to the portable device;

a second mode for allowing the viewer to perceive the image formed on a surface disposed in the optical path adjacent to the portable device;

a third mode for allowing the viewer to perceive the image by placing the eye in the optical path at a distance from the portable device; and a fourth mode for allowing the viewer to perceive the image formed on a surface disposed in the optical path at a distance to the portable device.

The present invention will become apparent upon reading the description taken in conjunction with FIGS. 1 to 7.

BEST MODE FOR CARRYING OUT THE PRESENT INVENTION

Figure 6:
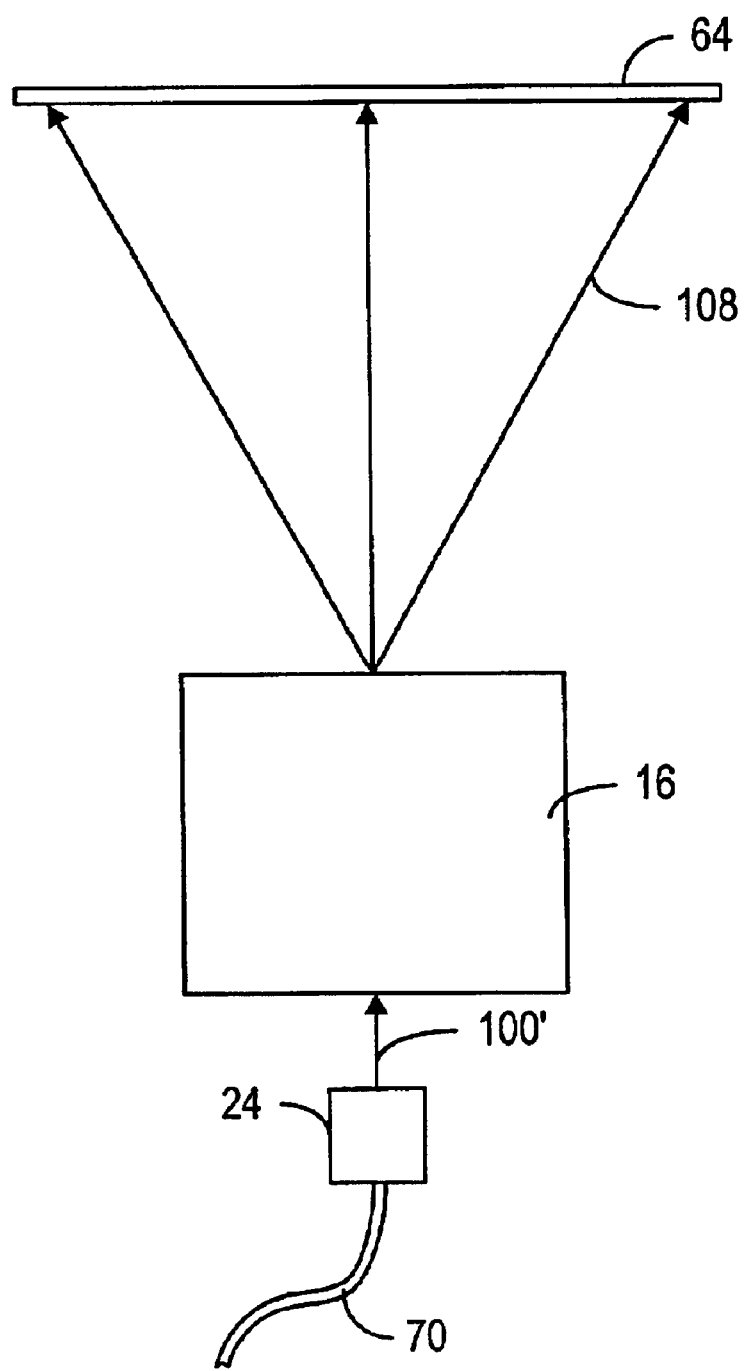
FIG. 6 is a diagrammatic representation showing the optical engine being used to provide a real image on a screen positioned at a distance from the portable device.
Figure 7:
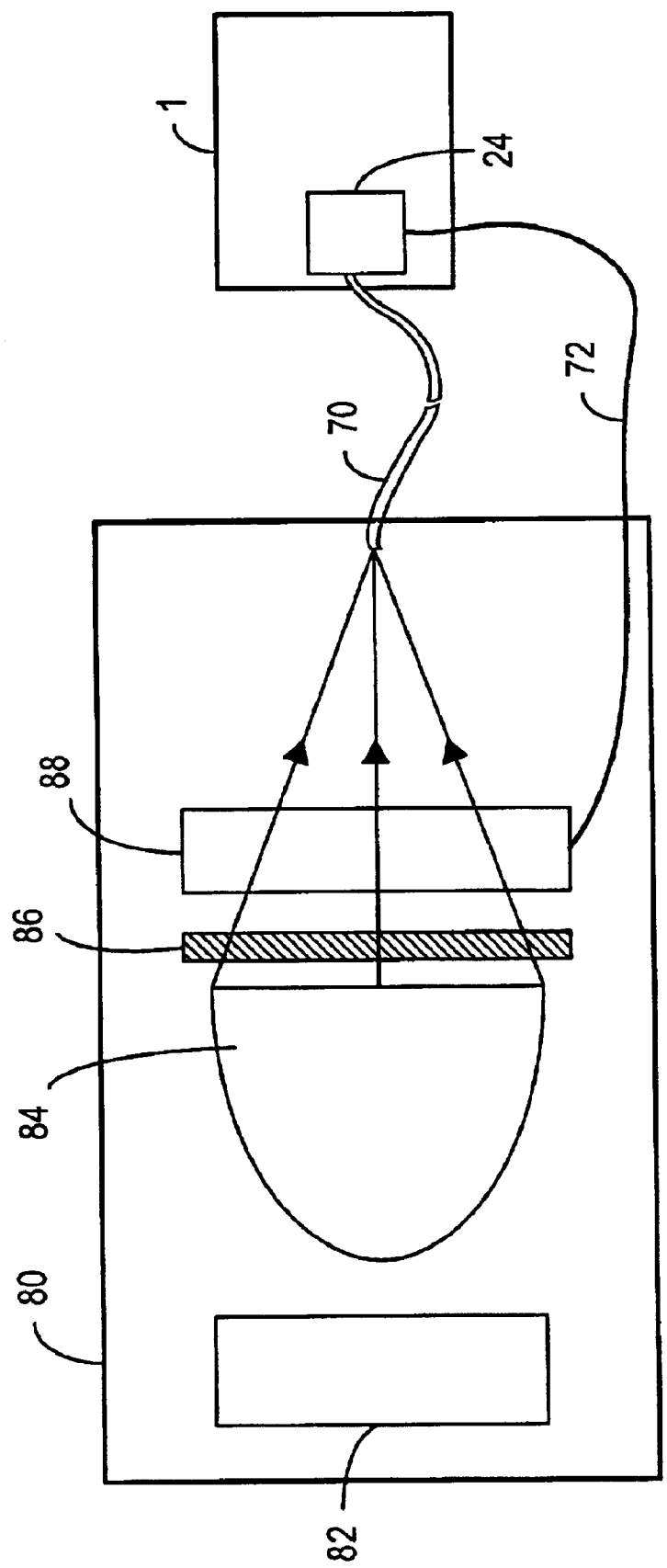
FIG. 7 is a diagrammatic representation showing an external light source.

The portable device 1, according to the present invention, uses an optical engine 16 and different optical arrangements to provide an image to a viewer in different display modes. The portable device 1 can be a mobile phone, a personal digital assistant (PDA), a communicator and other portable electronic devices. Preferably, the portable device 1 has a housing 10 to house a communication unit 12 for receiving and transmitting information from and to an external device, a controlling and processing unit 14 for handling the received or transmitted information. More particularly, the controlling and processing unit 14 is operatively connected to the optical engine 16 for providing image data to the microdisplay device 32, 32' or 32" to display an image thereon (see FIGS. 2a to 2c). In addition, the portable device 1 comprises an internal light source 20 for providing illuminating light to the optical engine 16, if necessary, and an internal power source 22 for providing power to the internal light source 20. The internal power source 22 may contain one or more batteries. Moreover, when the optical engine 16 is used for projecting a real image at a distance screen, it may be necessary to bring in a light beam from an external light source. Thus, it is preferable to have a connector 24 for connecting one end of a light guide 70 to the portable device 1 (FIGS. 6 and 7). In order to select the display modes, it is preferable to have a device 18 to select different optical arrangements for different display modes.

Figure 1:
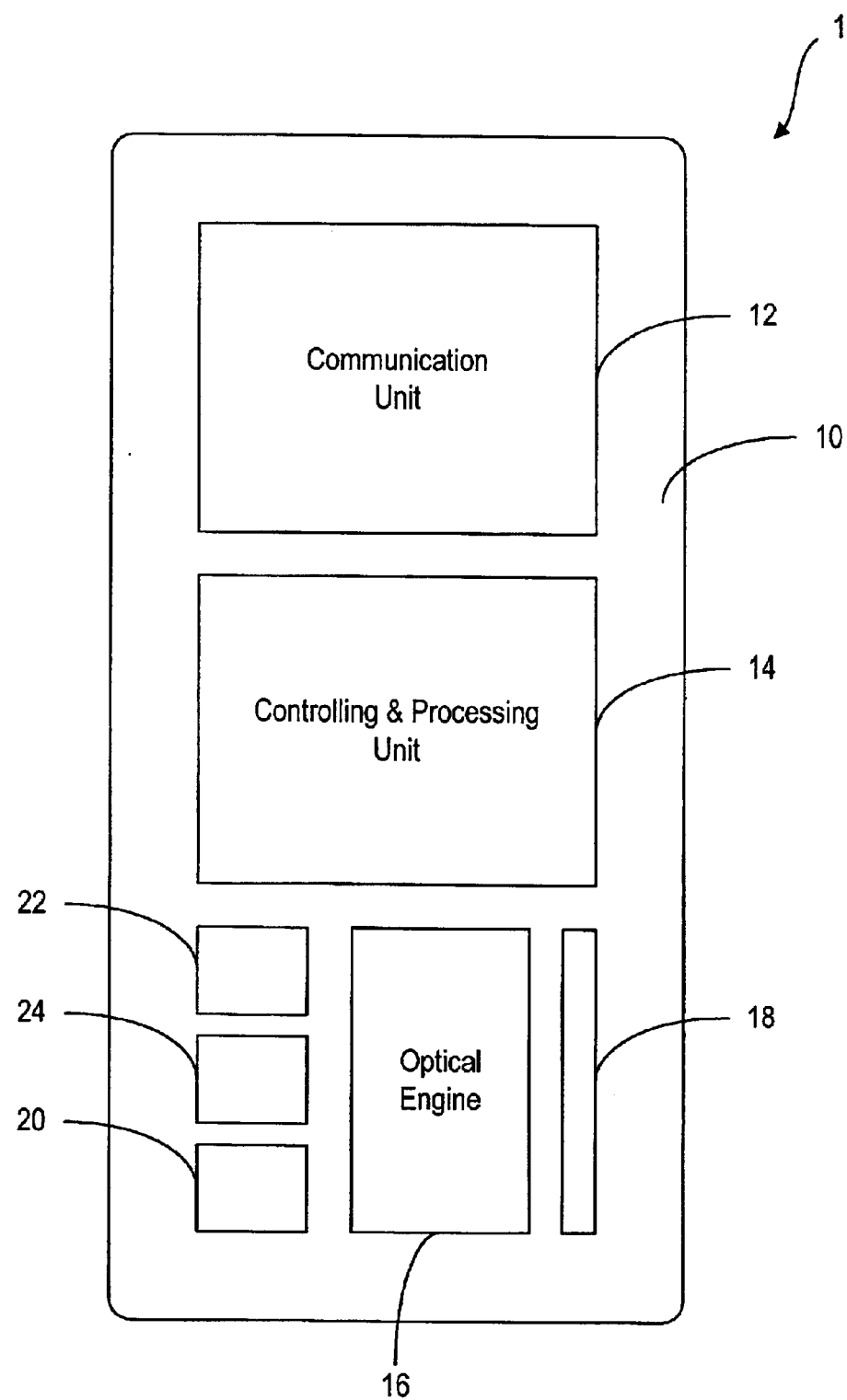
FIG. 1 is a block diagram showing some of the basic components in a portable device, according to the present invention.
Figure 2A:
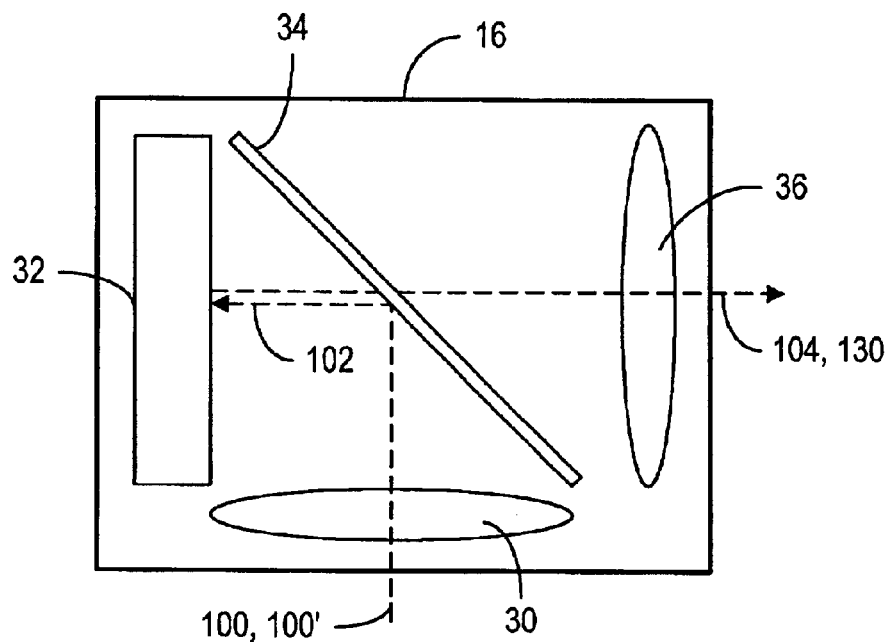
FIG. 2a is a diagrammatic representation showing an optical engine having a reflective-type microdisplay.

The optical engine 16, according to the present invention, may comprise a reflective-type microdisplay 32, a transmissive-type display 32', or an emissive-type display 32" as an image source. As shown in FIG. 2a, one or more lenses 30 are used to collect light 100 from the internal light source 20, or the light beam 100' brought in by the light guide 70, and expand the collected light into a broad beam 102 for illuminating the microdisplay 32. One or more lenses 36 are used to collect output light from the microdisplay device 32 for forming an image. As shown in FIG. 2a, a beam-splitter 34 is used to fold the optical path of the illuminating beam 102. More particularly, the beam splitter 34 is a polarizing beam-splitter (PBS) and the reflected light beam 102 is spolarized. With such an arrangement, the light beam 104 that provides an image to a viewer is p-polarized.

Figure 2B:
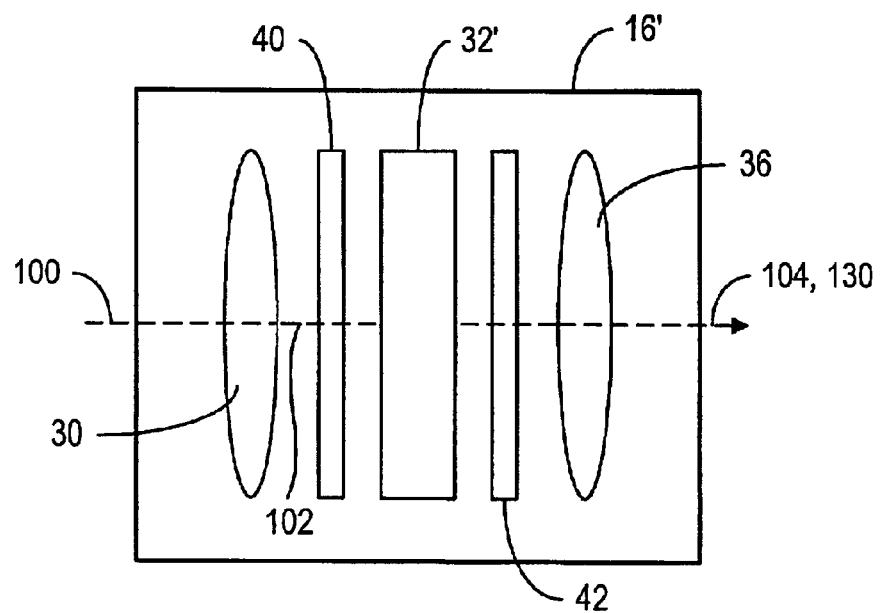
FIG. 2b is a diagrammatic representation showing an optical engine having a transmissive-type microdisplay.

When a transmissive-type microdisplay device 32' is used as an image source, as shown in FIG. 2b, it is possible to dispose the microdisplay device 32' between the illuminating optics 30 and the imaging optics 36 without folding the optical path of the expanded beam 102. Preferably, polarizers 40, 42 of different polarization axes are used to provide light beams with orthogonal polarization.

Figure 2C:
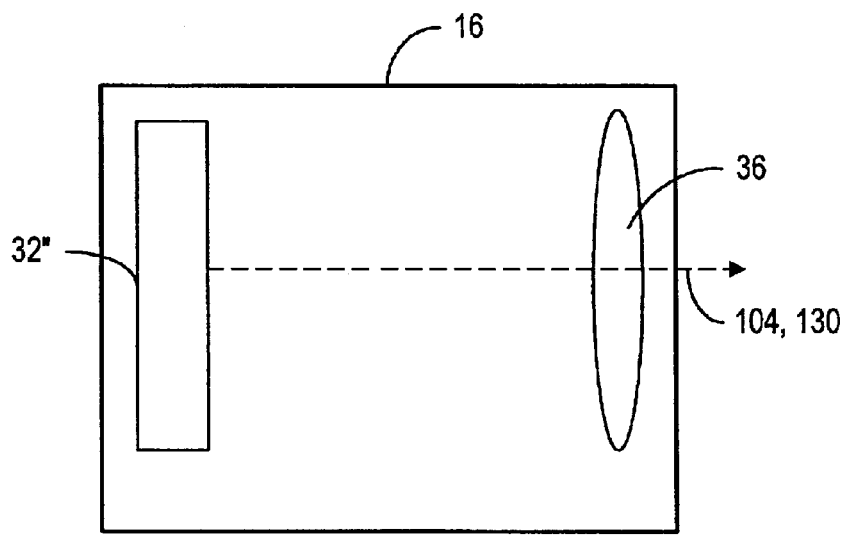
FIG. 2c is a diagrammatic representation showing the optical engine having an emissive-type microdisplay.

When an emissive-type microdisplay device 32" is used as an image source, as shown in FIG. 2c, no illuminating optics nor light source is needed. With an emissive-type microdisplay device 32", the optical engine 16 may not have sufficient light for projecting a real image at a distance screen.

It is understood that the image-forming beam 104 is propagated along an optical path 130 defined by the imaging optics 36. In order to view the image displayed on the microdisplay device 32, 32', 32", one must place an eye or an object in the optical path 130. The imaging optics 36, in the simplest case, is just a magnifying lens. In more complex cases, there might be several optical elements. In order that the imaging optics 36 in the optical engine 16 can be rearranged or reconfigured to form an image according to the mode of operation of the device 1, it is preferred that the imaging optics 36 comprise a plurality of lenses and other optical components.

Figure 3:
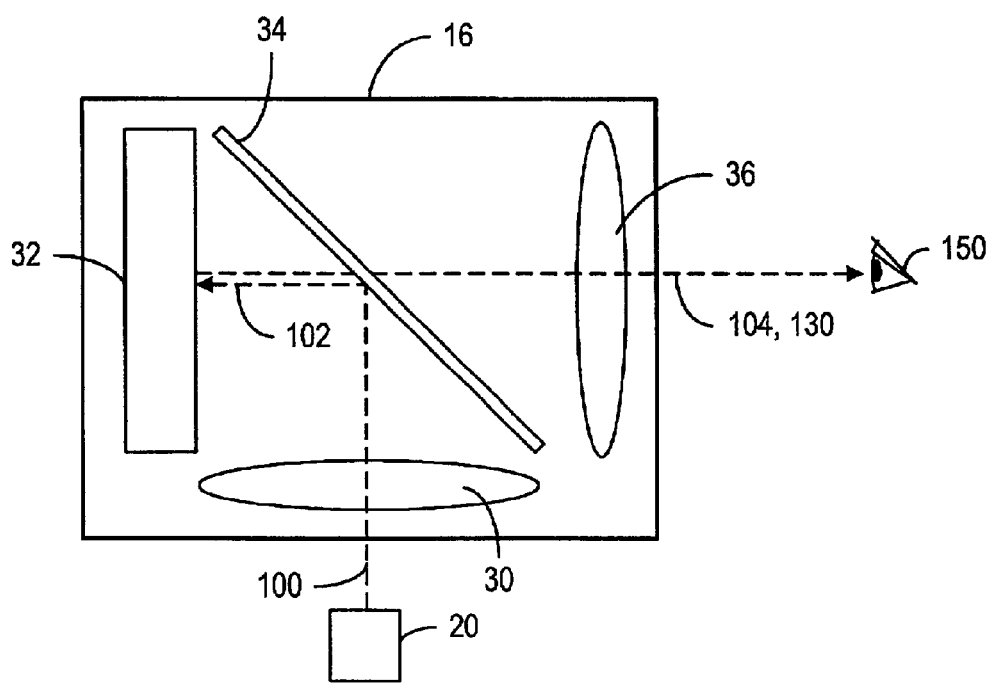
FIG. 3 is a diagrammatic representation showing the optical engine being used to provide a virtual image at a NED configuration.

The optical engine 16 is designed in such a way that, in the NED configuration, a viewer 150 can directly view the image formed by the imaging optics 36 by placing an eye in the optical path 130 adjacent to the portable device 1, as shown in FIG. 3. In this NED mode, the image provided by the optical engine 16 is a virtual image. The size of the perceived image can be slightly or significantly larger than the microdisplay device 32 itself. In the NED mode, the power consumption is low. Thus, it is possible to use the internal light source 20 for illumination. The internal light source 20 may comprise one or more light-emitting diodes powered by one or two batteries in the portable device 1, for example, but it is also possible to use a different type of lighting device.

Figure 4:
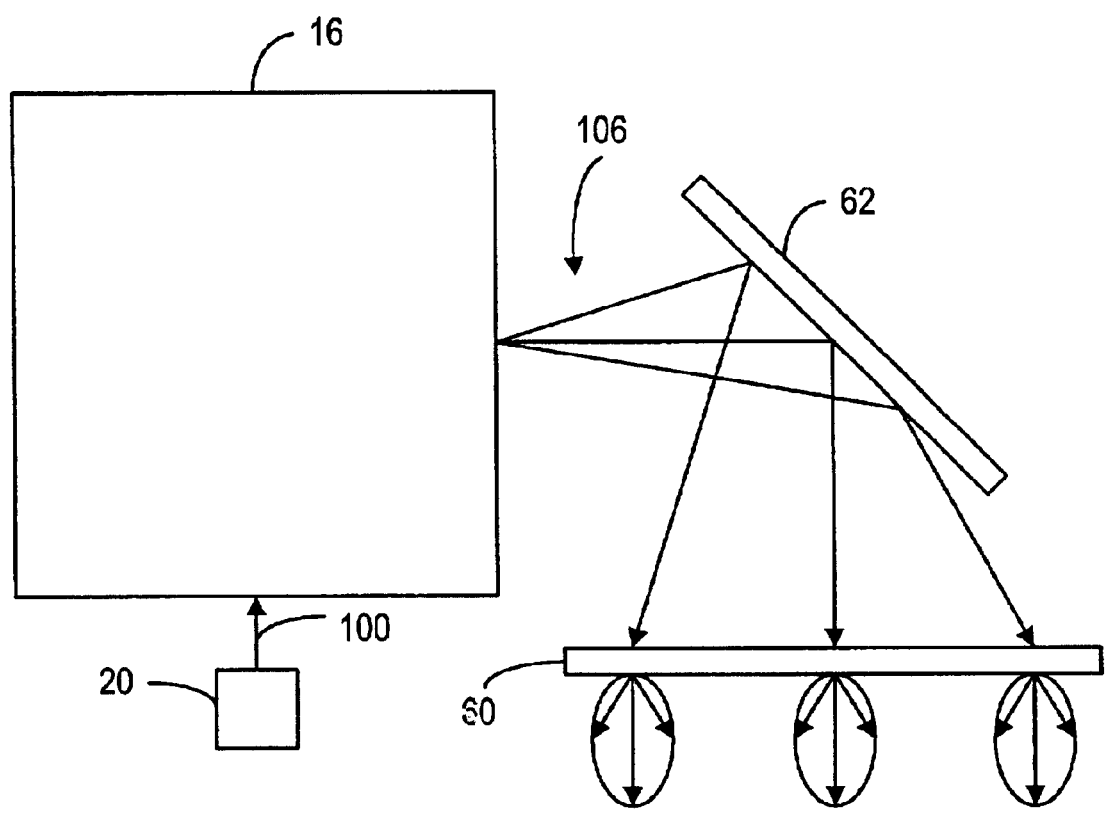
FIG. 4 is a diagrammatic representation showing the optical engine being used to provide a real image on a screen at a near distance via a reflector.

FIG. 4 shows an optical arrangement for the near projection display (NPD) mode. When the portable device 1 is used in the NPD mode, the imaging optics 36 are rearranged or reconfigured to form a real image on a surface or screen 60. A reflecting surface 62, such as a first surface mirror, is used to fold the optical path of the image-forming beam 106. Preferably, the projected image is in the order of 10 cm in diagonal and the screen is an integral part of the device. Although the power consumption in the NPD mode is expected to be much higher than that in the NED mode, it is still possible to use the internal light source 20 for illumination. Preferably, the screen 60 has such characteristics that the image can be viewed within a reasonably large viewing angle. The system can be used without a folding mirror or, alternatively, several mirrors can be used to fold the image-forming beam 106 in order to minimize the size of the device. It is possible that additional lenses and other optical components are disposed between the optical engine 16 and the screen 60 to reconfigure the NED optics.

Figure 5:
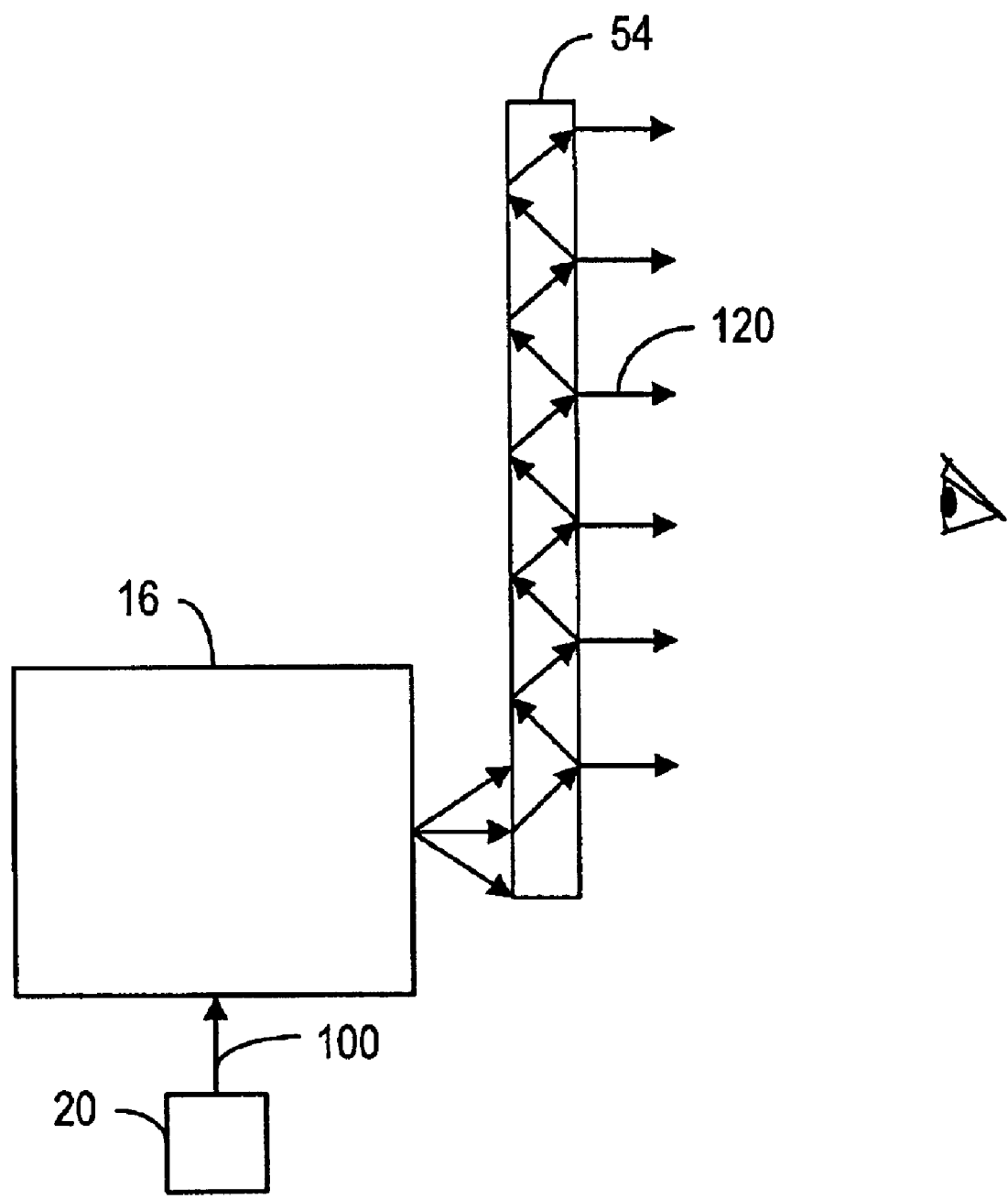
FIG. 5 is a diagrammatic representation showing the optical engine being used to provide a virtual image to be observed at a distance from the portable device.

In the third display mode (WMD), additional optical components are used to extend the exit pupil of the imaging optics 36 in the optical engine 16 so that the virtual image formed by the imaging optics 36 can be viewed at a greater distance from the device. As shown in FIG. 5, outgoing light 120 from an exit pupil extender 54 will form a virtual image at a distance from the device 1. The virtual image, as perceived by a viewer in this WMD mode, can be larger than the physical size of the extender 54 itself because the image appears at a distance. The power consumption of this mode is slightly higher than that of the NED mode, but lower than that of the NPD mode. It is possible to use the internal light source 20 for illumination.

The fourth display mode of the portable device 1, according to the present invention, is illustrated in FIG. 6. When the device is used in the fourth display mode, the imaging optics 36 are rearranged or reconfigured to project the real image by an image-forming beam 108 to a larger screen 64 at a larger distance. In this display mode, it is required that an external light source is used to provide an intense light beam to illuminate the microdisplay 32, 32'. To achieve this display mode, it is preferable to use a light guide 70 to convey an illuminating light beam from an external light source 80 (FIG. 7) to the portable device 1 through the connector 24. It is possible to use additional lenses and other optical components disposed between the optical engine 16 and the screen 64 to reconfigure the NED optics.

The light source for projection is typically a discharge lamp, such as an Ultra High Pressure (UHP) Mercury lamp. The efficiency of such a lamp is typically only about 10%, and the rest of the power is converted to heat. Quite a significant part of the heat is Infra Red (IR) radiation, which can overheat the microdisplay and cause severe damage to the portable device itself, or even destroy it within a short time. This problem is compounded by the fact that there would not be sufficient space in the portable device to include an effective cooling system to dissipate the heat associated with the light source. Thus, an external light source 80, such as the one shown in FIG. 7, must be used, instead of the internal light source 20.

As shown in FIG. 7, a lamp 84 with a reflector is used as a light source. The lamp 84 is powered by a power supply 82. The light output from the lamp is filtered by an IR/UV filter 86 and focused into the light guide 70. Preferably, a light sequencer 88 is provided in the light path to turn the light beam to the light guide 70 into sequential colors under the control of the portable device 1. As shown in FIG. 7, an electrical cable 72 connecting the portable device 1 to the external light source 80 allows the portable device 1 to send a control signal to the light sequencer 88 according to the selected display mode.

In summary, the portable device, according to the present invention, includes an optical engine, which is adapted to form an image according to one or more display modes. The portable device is designed such that the change between different display modes can be easily carried out.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A portable electronic device capable of providing a plurality of selectable display modes for providing an image to a viewer, said portable device comprising:
   an image source;
   an electronic unit for providing image data to the image source;
   a light source for providing illuminating light to the image source for providing output light from the image source; and
   an optical arrangement for forming the image from the output light provided by the image source along an optical path of the optical arrangement, wherein the optical arrangement is adapted to change so that said image forming is based on a selected one of the display modes, and wherein in at least one of the display modes is used to form a virtual image.

2. The portable electronic device of claim 1, wherein the selectable display modes include:
   a first mode for allowing the viewer to perceive the image by placing an eye of the viewer in the optical path; and
   a second mode for allowing the viewer to perceive the image formed on a surface disposed in the optical path.

3. The portable electronic device of claim 1, wherein the selectable display modes include:
   a first mode for allowing the viewer to perceive the image by placing an eye of the viewer in the optical path adjacent to the portable device; and
   a second mode for allowing the viewer to perceive the image formed on a surface disposed in the optical path adjacent to the portable device.

4. The portable electronic device of claim 1, wherein the selectable display modes include:
   a first mode for allowing the viewer to perceive the image by placing an eye of the viewer in the optical path adjacent to the portable device; and
   a second mode for allowing the viewer to perceive the image formed on a surface disposed in the optical path at a distance from the portable device.

5. The portable electronic device of claim 1, wherein the selectable display modes include:
   a first mode for allowing the viewer to perceive the image by placing an eye of the viewer in the optical path at a distance from the portable device; and
   a second mode for allowing the viewer to perceive the image formed on a surface disposed in the optical path adjacent to the portable device.

6. The portable electronic device of claim 1, wherein the selectable display modes include:
   a first mode for allowing the viewer to perceive the image by placing an eye of the viewer in the optical path at a distance from the portable device; and
   a second mode for allowing the viewer to perceive the image formed on a surface disposed in the optical path at a distance from the portable device.

7. The portable electronic device of claim 1, wherein the selectable display modes include:
   a first mode for allowing the viewer to perceive the image by placing an eye of the viewer in the optical path adjacent to the portable device; and
   a second mode for allowing the viewer to perceive the image by placing the eye in the optical path at a distance from the portable device.

8. The portable electronic device of claim 3, wherein the selectable display modes further include a third mode for allowing the viewer to perceive the image by placing the eye in the optical path at a distance from the portable device.

9. The portable electronic device of claim 3, wherein the selectable display modes further include a third mode for allowing the viewer to perceive the image formed on a further surface disposed in the optical path at a distance from the portable device.

10. The portable electronic device of claim 9, wherein the selectable display modes further include a fourth mode for allowing the viewer to perceive the image by placing the eye in the optical path at a distance from the portable device.

11. The portable electronic device of claim 1, wherein the image source is a reflective-type microdisplay device.

12. The portable electronic device of claim 1, wherein the image source is a transmissive-type microdisplay device.

13. The portable electronic device of claim 1, wherein the image source is an emissive-type microdisplay device.

14. The portable device of claim 2, wherein the light source comprises:
   a first lighting device powered by one or more batteries disposed within the portable device; and
   a second lighting device having a light guide for conveying to the portable device a light beam provided by an external light source, and wherein
      the first lighting device is used to provide the illuminating light to the image source when the selected one of the display modes is the first mode, and
      the second lighting device is used to provide the illuminating light to the image source when the selected one of the display modes is the second mode.

15. The portable device of claim 9, wherein the light source comprises:
   a first lighting device powered by one or more batteries disposed within the portable device; and
   a second lighting device having a light guide for conveying to the portable device a light beam provided by an external light source, and wherein
      the first lighting device is used to provide the illuminating light to the image source when the selected one of the display modes is either the first mode or the second mode, and
      the second lighting device is used to provide the illuminating light to the image source when the selected one of the display modes is the third mode.

16. The portable device of claim 10, wherein the light source comprises:
   a first lighting device powered by one or more batteries disposed within the portable device; and
   a second lighting device having a light guide for conveying to the portable device a light beam provided by an external light source, and wherein
      the first lighting device is used to provide the illuminating light to the image source when the selected one of the display modes is the first mode, the second mode or the fourth mode, and
      the second lighting device is used to provide the illuminating light to the image source when the selected one of the display modes is the third mode.

17. The portable device of claim 14, wherein the external light source comprises a control device capable of operating
   in a first operating mode for preventing the light beam provided by the external light source from being conveyed by the light guide to the portable device, and
   in a second operating mode for allowing the light beam from the external light source to be conveyed by the light guide to the portable device, and wherein the portable device further comprises means, responsive to the display modes, for sending a signal to the control device for selecting the first operating mode when the selected one of the display modes is the first mode, and for selecting the second operating mode when the selected one of the display modes is the second mode.

18. The portable electronic device of claim 1, further comprising a polarizing device, disposed adjacent to the image source, for selecting a first polarization state in the illuminating light to the image source and a second polarization state in the output light from the image source, wherein the first polarization state is different from the second polarization state.

19. The portable electronic device of claim 11, further comprising a polarizing beam-splitter, disposed adjacent to the image source, for selecting a first polarization state in the illuminating light to the image source and a second polarization state in the output light from the image source, wherein the first polarization state is different from the second polarization state.

20. The portable electronic device of claim 6, further comprising an optical connection means for receiving light from an external light source for forming the image in the second mode.

* * * * *